United States Patent
Tracey et al.

(10) Patent No.: US 10,853,133 B2
(45) Date of Patent: Dec. 1, 2020

(54) METHOD AND APPARATUS FOR SCHEDULING TASKS TO A CYCLIC SCHEDULE

(71) Applicant: Robert Bosch GmbH, Stuttgart (DE)

(72) Inventors: Nigel Tracey, York (GB); Alexander Vensmer, Schoenaich (DE); Gary Morgan, Thixendale (GB); Michael Mutter, Korntal-Muenchingen (DE); Paul Austin, Dunnington York (GB); Thomas Wendel, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 15/968,342

(22) Filed: May 1, 2018

(65) Prior Publication Data
US 2018/0321973 A1  Nov. 8, 2018

(30) Foreign Application Priority Data
May 4, 2017 (EP) ..................................... 17169414

(51) Int. Cl.
*G06F 9/48* (2006.01)
*G06F 9/455* (2018.01)
*G06F 9/54* (2006.01)

(52) U.S. Cl.
CPC ........ *G06F 9/4887* (2013.01); *G06F 9/45558* (2013.01); *G06F 9/4881* (2013.01); *G06F 9/54* (2013.01)

(58) Field of Classification Search
CPC .. G06F 9/4887; G06F 9/45558; G06F 9/4881; G06F 9/54
See application file for complete search history.

(56) References Cited

U.S. PATENT DOCUMENTS

2004/0193812 A1* 9/2004 Zayas .................. G06F 11/261
 711/154
2010/0229179 A1* 9/2010 Moore ................. G06F 9/4881
 718/104

(Continued)

FOREIGN PATENT DOCUMENTS

WO  2004059481 A2  7/2004

OTHER PUBLICATIONS

Duda, et al.: "Borrowed-Virtual-Time (BVT) scheduling: supporting latency-sensitive treads in a general-purpose scheduler", Operating Systems Review, ACM 33(5), (1999), pp. 261-276.

*Primary Examiner* — Jacob D Dascomb
(74) *Attorney, Agent, or Firm* — Norton Rose Fulbright US LLP; Gerard Messina

(57) ABSTRACT

A method for scheduling tasks to a cyclic schedule, comprising maintaining a request queue, a count, the count being initialized to a given limit, and an index of a current time slot within the schedule. Periodically, if the request queue contains a reference to an urgent task among the tasks, that reference is removed from the request queue and the urgent task is dispatched and if the request queue is empty, the index is advanced to the next time slot within the schedule. If the next time slot is statically assigned to a task among the tasks, that task is dispatched, and if the next time slot is unassigned and the count is below the limit, the count is incremented and the index is further advanced to the next but one time slot.

9 Claims, 1 Drawing Sheet

(56) References Cited

U.S. PATENT DOCUMENTS

2017/0024247 A1    1/2017   Evripidou et al.
2018/0295052 A1*  10/2018   St-Laurent .............. G06F 9/545

* cited by examiner

METHOD AND APPARATUS FOR SCHEDULING TASKS TO A CYCLIC SCHEDULE

CROSS REFERENCE

The present application claims the benefit under 35 U.S.C. § 119 of EP 17169414.4 filed on May 4, 2017, which is expressly incorporated herein by reference in its entirety.

FIELD

The present invention pertains to a method for scheduling computer tasks to a cyclic schedule. The present invention further pertains to corresponding apparatus, a corresponding computer program as well as a corresponding storage medium.

BACKGROUND INFORMATION

In computing, a "task" is any unit of execution or work. Depending on context, a task may take the form of a process, thread of execution, or entire virtual machine run by a hypervisor. The method by which such task is assigned to a computing resource is known in the art as scheduling. In real-time environments, such as embedded systems for automatic control in the automotive or robotics industries, the scheduling method must ensure that the scheduled tasks meet certain deadlines; this is crucial for keeping the system stable.

U.S. Patent Appl. Pub. No. 2017/0024247 A1 describes a method for hosting a multitasking guest on a host system, wherein the guest is allocated a periodic execution server and a deferrable execution server associated with a partition of the system, event-driven tasks of the guest are assigned to the deferrable execution server, time-driven tasks of the guest are assigned to the periodic execution server, a hypervisor of the execution servers is assigned to a first priority group of the system, the periodic execution server is assigned to a second priority group of the system, the deferrable execution server is assigned to a third priority group of the system, and a preemptive task scheduler maintains a descending priority order among the priority groups while the execution servers execute the tasks concurrently.

SUMMARY

The present invention provides a method for scheduling tasks to a round-robin or other cyclic schedule, corresponding apparatus, a corresponding computer program as well as a corresponding storage medium according to the independent claims.

An example embodiment of the present invention is based on the insight that conventional hypervisors are typically limited to one virtual machine (VM) per core. An advanced hypervisor lifts this constraint by permitting more than one virtual machine per core while still allowing the real-time behavior of VMs to be reasoned about in a simple manner.

In many pertinent systems, it is not required that a VM should be able to handle interrupts outside its allotted slot. A round-robin or cyclic scheduler is well suited to this type of system. This cyclic scheduler method of scheduling tasks, processes, or VMs has been used for many years and is well understood. A set of VMs exists and each is allocated a fixed amount of run time. A cycle consists of running each VM, one after the other, with the fixed amount of run time.

A VM does not need to release control of the processor. The hypervisor or operating system (OS) uses clock-tick interrupts to take control away from one VM and allocate the processor to the next. Within a VM, the guest system is free to perform whatever scheduling it requires of entities within itself.

This scheduling model means that, at build time, the execution periods and run time allocations are known for all VMs so that, for example, the amount of central processing unit (CPU) time and latency can easily be calculated. Furthermore, temporal separation between VMs, which is very important in real-time and safety-critical systems, is maintained.

This system is very inflexible. Since the generic cyclic scheduler does not allow a VM to be given extra CPU time on a dynamic basis when needed to meet latency requirements of an embedded system, a VM only runs in schedule slots assigned to it. However, there may be circumstances where very demanding latency requirements mean that a VM must be run immediately, preempting normal scheduling—for example, during start-up of an electronic control unit (ECU). The mechanism described hereinafter allows this to be done whilst retaining the ability to reason about the amount of time allocated to VMs and to avoid compromising temporal separation.

An embodiment of the present invention has the advantage that it allows software managing the operation of a hypervisor to attribute extra runtime to a VM from a statically declared, i.e., bounded at build time—pool of spare time. This improvement may be combined with an approach to partition scheduling where VMs themselves may request time from this pool of spare time.

Advantageous refinements of and improvements to the present invention are described herein.

BRIEF DESCRIPTION OF THE DRAWINGS

Example embodiments of the present invention are illustrated in the figures and are explained in more detail below.

Similar reference characters denote corresponding features consistently throughout the figures.

DETAILED DESCRIPTION OF EXAMPLE EMBODIMENTS

Figure 1:
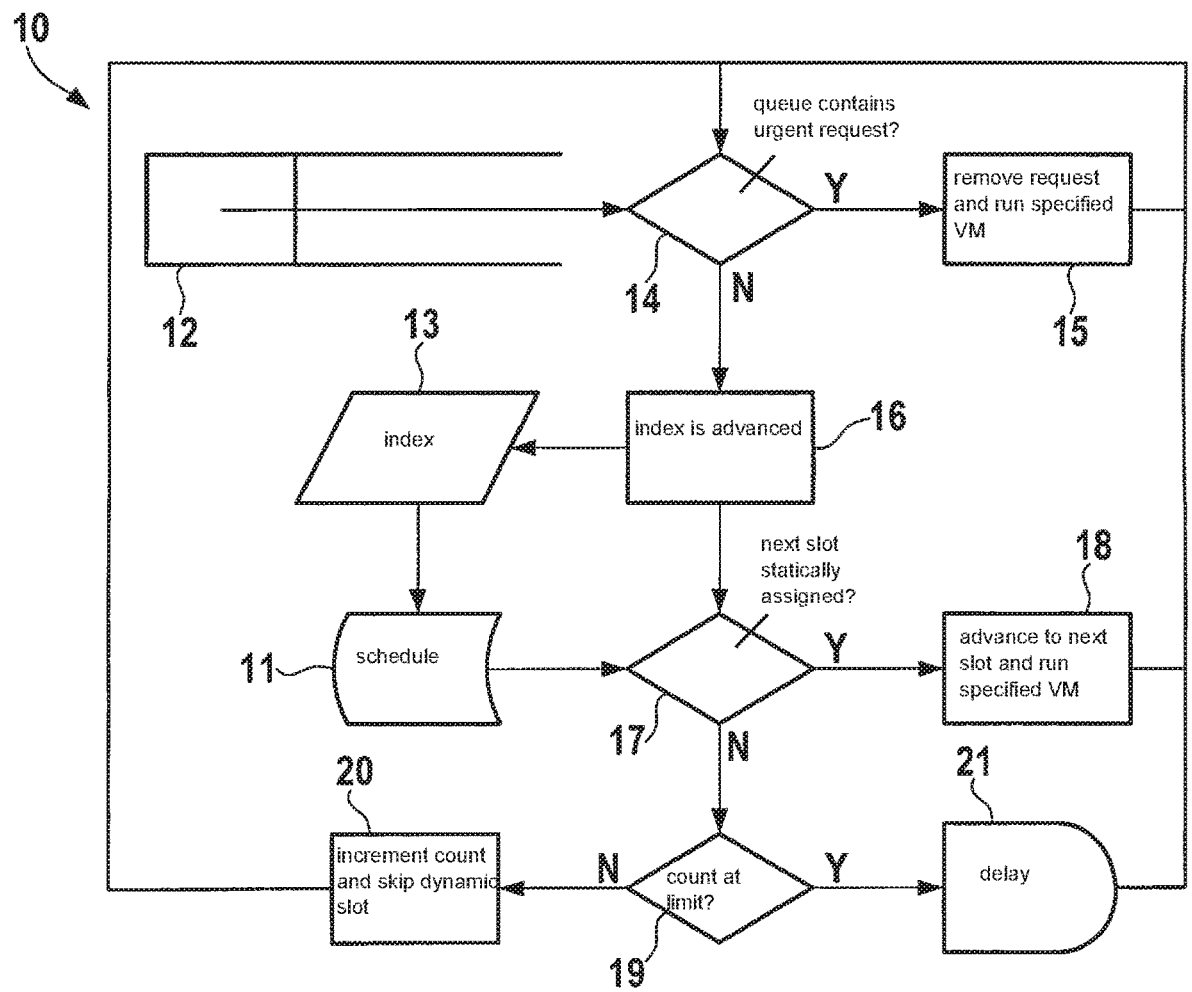
FIG. 1 shows the flowchart of a method according to a first embodiment.

FIG. 1 shows a method (10) as per an example embodiment of the present invention. The system to which the present embodiment applies consists of a hypervisor hosting several VMs—or an OS hosting several tasks—and some management software that controls the overall system, including the hypervisor. The management software is more privileged than the VMs and, in a safety-relevant automotive system, must be at the highest Automotive Safety Integrity Level (ASIL) of the system.

The hypervisor has a schedule (11) consisting of an ordered collection of slots. A slot may either be statically assigned to a VM or may be dynamic, that is, as yet unassigned. Under normal operation, the hypervisor starts at the first slot in the schedule (11) and runs the specified VM until a clock-tick interrupt occurs. On occurrence of the clock-tick interrupt, the hypervisor suspends the VM being run, advances to the next slot in the schedule (11), and runs the specified VM (process 18). This running of VMs as described by the schedule (11) is repeated on every subsequent clock-tick interrupt. If a slot is dynamic (decision 17, branch N), the hypervisor idles (delay 21) rather than running a VM. When the hypervisor reaches the end of the schedule (11), it returns to the beginning.

Beyond these conventional features, the proposed hypervisor differs from the prior art in that there is a first-in-first-out (FIFO) queue (12) of VM extra-time requests made by the management software. This queue (12) has a free-space count initialized to a limit value specified in the hypervisor configuration.

The hypervisor further provides for an API that can be used by the management software—but not by VMs—to request extra time for a VM. When this API is called and the free-space count is 0, the API call is ignored. When this API is called and the free-space count is not 0, then the specified VM is added to the end of the queue (12) and the free-space count is decremented by 1.

Given this environment, when a clock-tick interrupt occurs and the queue (12) is not empty (decision 14, branch Y), the hypervisor removes the request at the front of the queue (12) and runs (process 15) the VM specified by the request until the next clock-tick interrupt occurs. However, the hypervisor does not increment the free-space count, nor does it advance its position (index 13) in the schedule (11) (cf. 16).

When a clock-tick interrupt occurs and the queue (12) is empty (decision 14, branch N), scheduling proceeds as normal, except that if the next schedule (11) slot is dynamic (decision 17, branch N) and the free-space count is less than its configured limit value (decision 19, branch N), then the hypervisor increments the free-space count by 1 and skips the dynamic slot (process 20)—that is, it proceeds to the next but one time slot without idling (delay 21).

These extensions mean that the management software can instruct the hypervisor to run certain VMs as soon as the next clock tick occurs, preempting normal scheduling.

However, the free-space count mechanism ensures that the management software is just "borrowing" dynamic slots from the future. Therefore, over some statically determinable time-period, a VM will always be run for as much time as has been allocated in the schedule (11).

There are two notable advantages to this method (10) of scavenging spare run time: First, it is not necessary to modify the guest software—i.e. the software running in a VM—to indicate when it is possible to switch another VM. Second, the timing properties of a guest system, when scavenging run time in this manner, are easier to model.

Figure 2:
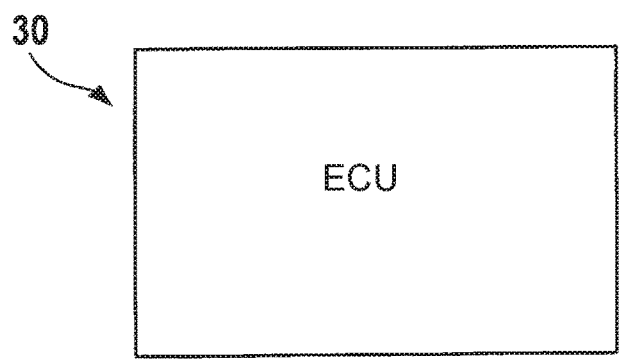
FIG. 2 shows the schematic representation of an electronic control unit according to a second embodiment.

This method (10) may be implemented, for example, in software or hardware or a hybrid of software and hardware, for example in an ECU (30) as illustrated in the schematic diagram of FIG. 2.

What is claimed is:

1. A method for scheduling tasks to a cyclic schedule, comprising:
    maintaining a request queue, a count, the count being initialized to a given limit, and an index of a current time slot within the cyclic schedule, wherein periodically:
        if the request queue contains a reference to an urgent task among the tasks, the reference is removed from the request queue and the urgent task is dispatched; and
        if the request queue is empty, the index is advanced to the next time slot within the cyclic schedule, wherein:
            if the next time slot is statically assigned to a first task among the tasks, the first task is dispatched, and
            if the next time slot is unassigned and the count is below the given limit, the count is incremented and the index is further advanced to the next but one time slot.

2. The method according to claim 1, wherein upon request by management software while the count is greater than zero, the count is decremented and a reference to a specified task among the tasks is added to the request queue.

3. The method according to claim 2, wherein the request is submitted through an application programming interface.

4. The method according to claim 3, wherein the request queue, the count, and the index are maintained by a hypervisor providing the application programming interface.

5. The method according to claim 4, wherein the hypervisor is in the form of a type-1 hypervisor.

6. The method according to claim 4, wherein the management software controls the hypervisor and the tasks.

7. The method according to claim 4, wherein access to the application programming interface is restricted to the management software.

8. A non-transitory machine-readable storage medium on which is stored a computer program for scheduling tasks to a cyclic schedule, the computer program, when executed by a computer, causing the computer to perform:
    maintaining a request queue, a count, the count being initialized to a given limit, and an index of a current time slot within the cyclic schedule, wherein periodically:
        if the request queue contains a reference to an urgent task among the tasks, the reference is removed from the request queue and the urgent task is dispatched; and
        if the request queue is empty, the index is advanced to the next time slot within the cyclic schedule, wherein:
            if the next time slot is statically assigned to a first task among the tasks, the first task is dispatched, and
            if the next time slot is unassigned and the count is below the given limit, the count is incremented and the index is further advanced to the next but one time slot.

9. An apparatus adapted to schedule tasks to a cyclic schedule, the apparatus adapted to:
    maintain a request queue, a count, the count being initialized to a given limit, and an index of a current time slot within the cyclic schedule, wherein periodically:
        if the request queue contains a reference to an urgent task among the tasks, the reference is removed from the request queue and the urgent task is dispatched; and
        if the request queue is empty, the index is advanced to the next time slot within the cyclic schedule, wherein:
            if the next time slot is statically assigned to a first task among the tasks, the first task is dispatched, and
            if the next time slot is unassigned and the count is below the given limit, the count is incremented and the index is further advanced to the next but one time slot.

* * * * *